(12) United States Patent
Kikuchi

(10) Patent No.: US 7,919,948 B2
(45) Date of Patent: Apr. 5, 2011

(54) DESKTOP CHARGER HOLDER

(75) Inventor: Yoshifumi Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 223 days.

(21) Appl. No.: 12/293,882

(22) PCT Filed: Mar. 2, 2007

(86) PCT No.: PCT/JP2007/054054
§ 371 (c)(1),
(2), (4) Date: Sep. 22, 2008

(87) PCT Pub. No.: WO2007/111078
PCT Pub. Date: Oct. 4, 2007

(65) Prior Publication Data
US 2009/0121680 A1   May 14, 2009

(30) Foreign Application Priority Data

Mar. 27, 2006   (JP) .................................. 2006-085219

(51) Int. Cl.
*H02J 7/00* (2006.01)
(52) U.S. Cl. .................. 320/115; 455/573; 379/455
(58) Field of Classification Search .................. 320/115; 455/573
See application file for complete search history.

(56) References Cited

U.S. PATENT DOCUMENTS

| | | | | |
|---|---|---|---|---|
| 5,739,665 A | * | 4/1998 | Bares | 320/115 |
| 5,828,966 A | * | 10/1998 | Davis et al. | 455/573 |
| 5,953,048 A | * | 9/1999 | Mikami et al. | 348/14.01 |
| 7,199,554 B2 | * | 4/2007 | Kim et al. | 320/114 |
| 7,242,165 B2 | * | 7/2007 | Lee et al. | 320/115 |

FOREIGN PATENT DOCUMENTS

| | | |
|---|---|---|
| JP | 1993030167 A | 2/1993 |
| JP | 1998150485 A | 6/1998 |
| JP | 2003134680 A | 5/2003 |
| JP | 2005073143 A | 3/2005 |
| JP | 2005086500 A | 3/2005 |

OTHER PUBLICATIONS

International Search Report for PCT/JP2007/054054 mailed Mar. 27, 2007.

* cited by examiner

*Primary Examiner* — Edward Tso
*Assistant Examiner* — Ramy Ramadan

(57) ABSTRACT

A desktop charger holder (1) of this invention includes a holder portion (2) which stores a portable telephone (7), a base (3) which supports the holder portion (2), pivot enabling means (9, 16) for enabling the holder portion (2) to be pivotal with respect to the base (3), and holding/fixing means (10, 12) for holding and fixing the pivot angle of the holder portion (2) with respect to the base (3). The desktop charger holder (1) is configured such that a barycenter of the portable telephone (7) and the holder portion (2), when the portable telephone (7) is stored in the holder portion (2), is present on the surface of the base (3). This can provide an easy-to-use desktop charger holder (1) in which even if the angle (angle of elevation) of the holder portion (2) storing the portable telephone (7) is changed, the central position of a display screen does not change, and a barycenter exists within a specific range.

8 Claims, 7 Drawing Sheets

DESKTOP CHARGER HOLDER

TECHNICAL FIELD

The present invention relates to a desktop charger holder and, more particularly, to a desktop charger holder for a portable telephone which has a function of receiving a television signal or the like so that the user can watch television.

BACKGROUND ART

In recent years, a portable telephone having a function of receiving a television signal or the like so that the user can watch television is becoming popular. Usually, the display of the portable telephone is vertically long. In contrast to this, a television image frame is horizontally long. When receiving the television signal so that the user can watch television, the user rotates the portable telephone through 90° counterclockwise or clockwise, that is, the user inclines the display to fall sideways. Receiving the television signal and watching television require high power consumption. When the user wishes to watch television for a long period of time continuously, he or she must set the portable television on a charger holder and watch television while charging the incorporated cell (battery or the like).

FIGS. 6A and 6B show a conventional desktop charger holder. A portable telephone 62 has a function of receiving a television signal or the like so that the user can watch television. A display 61 of the portable telephone 62 is usually used in a vertically long state. When receiving the television signal so that the user can watch television, the user sets the portable telephone 62 on a desktop charger holder 63, sets a stand 64 accompanying the desktop charger holder 63 upright, and adjusts the angle formed by the stand 64 and desktop charger holder 63 so that he can observe the display 61 easily. More specifically, the user sets the portable telephone 62 on the desktop charger holder 63, the user lays the desktop charger holder 63 so that he can see the display 61 easily, and the stand 64 supports the desktop charger holder 63 so as not to fall down.

For example, the stand 64 is formed of a plastic resin plate, and usually stored in the storing portion (not shown) of the desktop charger holder 63. When receiving the television signal so that the user can watch television, the stand 64 can be taken out from the storing portion and set at an appropriate angle. To form the stand 64, alternatively, a steel wire may be bent to form three continuous sides of a rectangle, and the rectangle may be attached to the desktop charger holder 63.

With the conventional desktop charger holder 63, when the user tries to set the display 61 at such an angle that he can observe it easily, depending on the standing angle of the stand 64, the barycenter of the combination of the portable telephone 62 and desktop charger holder 63 falls outside the contact point (the portion where the desktop charger holder 63 is in contact with the desk or the like) 65, or the barycenter is located at a high position. Then, the desktop charger holder 63 on which the portable telephone 62 is set becomes very unstable. Also, the stand 64 may skid on the surface of the desk or the like, and the desktop charger holder 63 may fall down accordingly. Therefore, the stand angle of the stand 64 is restricted, resulting in very inconvenience.

Reference 1 (Japanese Patent Laid-Open No. 5-30167) deserves attention because after the portable telephone is set on the charging device, the set angle can be changed. FIG. 7 shows the charging device disclosed in reference 1. An electronic device 72 comprising a display operating portion 73 is set on a battery installation portion 76, and a battery 71 is charged. At this time, to improve the readability of information displayed on the display operating portion 73, an angle θ formed by the battery installation portion 76 and a housing 74 can be changed.

However, with the charging device of reference 1, the electronic device 72 cannot be set such that the vertically long display operating portion 73 can be set horizontally long. The purpose of changing the angle θ formed by the battery installation portion 76 and housing 74 is to improve the readability and operability of the display operating portion 73 when hanging the charging device on the wall at the bottom surface. Therefore, it is not intended to apply the charging device of reference 1 to a portable telephone having a function of receiving a television signal or the like so that the user can watch television, which is the object of the present invention.

Reference 2 (Japanese Patent Laid-Open No. 2005-73143) deserves attention because after setting a portable telephone having a function of receiving a television signal or the like so that the user can watch television, the user can rotate the display screen through 90° to set it horizontally long, and can watch a television image or the like. FIGS. 8A and 8B show a portable information terminal device holder (charger) of reference 2.

A portable telephone 810 comprising a display screen 811 is held by a holding portion 82 of a charger 81 and charged. At this time, the holding portion 82 can be rotated by a rotary mechanism portion 83 through 360° with respect to a support pedestal 84. As shown in FIG. 8B, the display screen 811 of the portable telephone 810 can rotate clockwise and counterclockwise. With this arrangement, the user can set the portable telephone 810 having the function of receiving the television signal or the like on the charger 81 so that he can watch television, and watch television by receiving the television signal while charging the portable telephone 810.

However, the angle formed by a support portion 842 and pedestal portion 841 of the support pedestal 84 is fixed. Even if the portable telephone 810 can be set such that the display screen is horizontally long, the angle of inclination (angle of elevation) of the display screen cannot be adjusted, and sometimes the readability of the display content is poor. According to reference 2, the holding portion 82 can hold the portable telephone 810 such that the display screen 811 comes to the front. In this case, the support portion 842 may be set upright vertically with respect to the horizontal plane.

More specifically, the angle formed by the support portion 842 and pedestal portion 841 can be set freely in the manufacture of the charger 81. Once the charger 81 is finished, this angle cannot be set freely. Accordingly, once the angle is determined, it cannot be changed easily. Even if the angle formed by the support portion 842 and pedestal portion 841 can be freely changed with the arrangement of reference 2, depending on the angle, the barycentric position falls outside the support pedestal 84, and the stability becomes poor. In addition, when the angle changes, the central position of the display screen 811 also changes. Even if the angle can be set to provide high readability, the central position of the display screen 811 may become high in turn and requires adjustment.

DISCLOSURE OF INVENTION

Problem to be Solved by the Invention

According to a conventional desktop charger holder, when the user sets a portable telephone on the holder to receive the television signal so that he can watch television, if he changes the angle (angle of elevation) of the holder portion (desktop charger holder), on which the portable telephone is set, with respect to the housing, support pedestal, desk, or the like, the central position of the display screen changes, and the barycentric position changes. This degrades the stability, resulting in very inconvenience.

It is, therefore, an object of the present invention to provide an easy-to-use desktop charger holder for a portable telephone, in which even if the angle (angle of elevation) of the holder portion on which the portable telephone is set is changed, the central position of the display screen does not change and the barycenter stably exists within a specific range.

Means of Solution to the Problem

A desktop charger holder according to the present invention is characterized by comprising a holder portion which stores a portable telephone, a base which supports the holder portion, pivot enabling means for enabling the holder portion to be pivotal with respect to the base, and holding/fixing means for holding and fixing a pivot angle of the holder portion with respect to the base, wherein a barycenter of the portable telephone and the holder portion, when the portable telephone is stored in the holder portion, is present on a surface of the base.

EFFECTS OF THE INVENTION

The desktop charger holder according to the present invention exhibits the following excellent effects.
(1) When the user sets the portable telephone and watches television by receiving the television signal, he can adjust the angle (angle of elevation) of the display screen easily by pivoting the holder portion.
(2) Even when the angle (angle of elevation) of the holder portion, on which the portable telephone is set, with respect to the housing, support pedestal, desk, or the like is changed, the barycentric position is present on the surface of the base or almost on the pivot axis of the holder, so that the operation stability is very good.
(3) Even when the angle (angle of elevation) of the holder portion on which the portable telephone is set is changed, the central position of the display screen hardly changes. Therefore, an easy-to-use charger for a portable telephone can be provided.

BEST MODE FOR CARRYING OUT THE INVENTION

The exemplary embodiments of the present invention will be described in detail with reference to the drawings. Note that the present invention is not limited to these exemplary embodiments disclosed herein.

First Exemplary Embodiment

Figure 1:
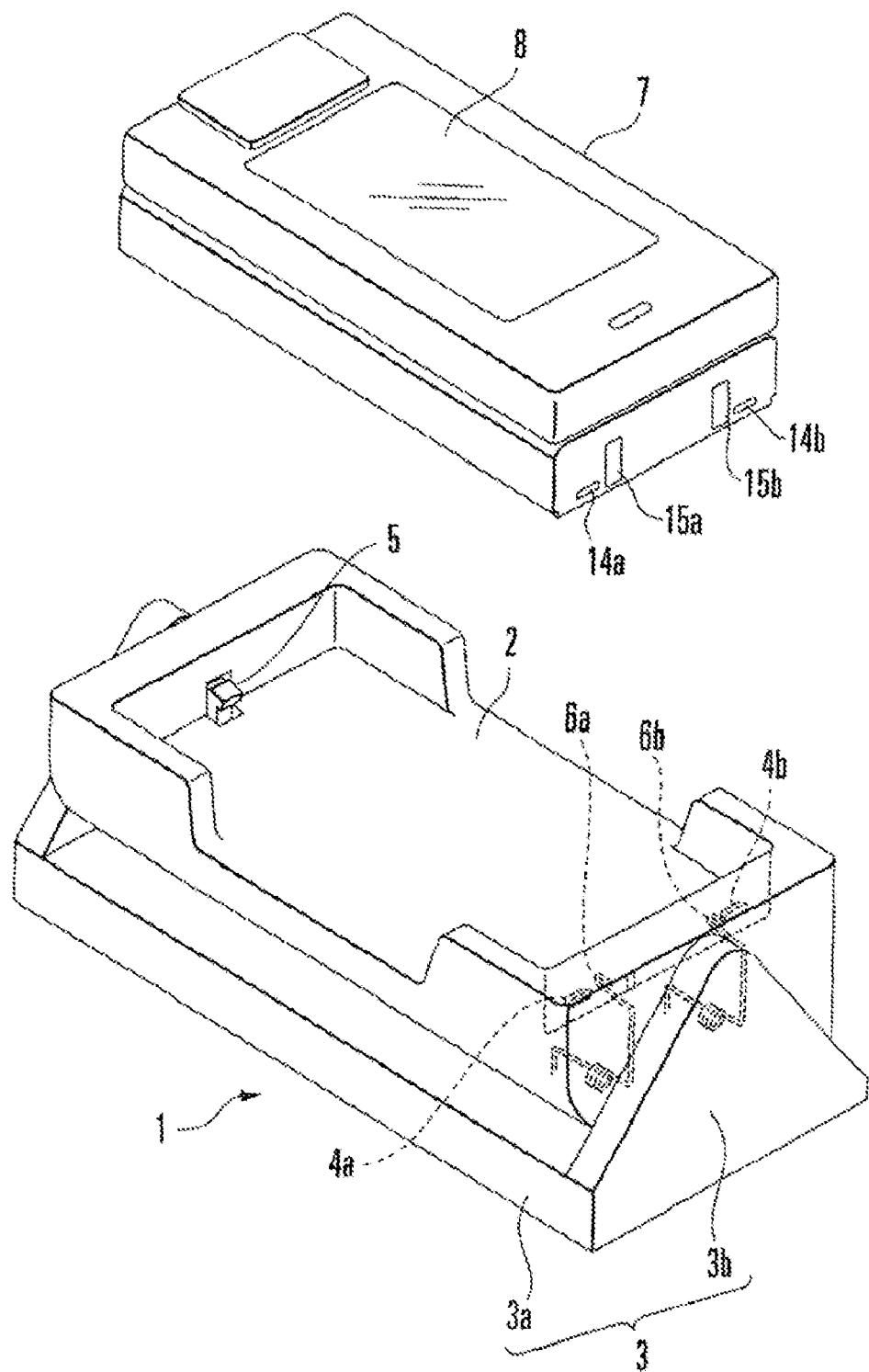
FIG. 1 is a perspective view showing a state immediately before a portable telephone is set on a desktop charger holder according to the first exemplary embodiment of the present invention.

FIG. 1 shows a desktop charger holder for a portable telephone according to the first exemplary embodiment of the present invention. FIG. 1 shows a state immediately before a portable telephone 7 is set on a desktop charger holder 1. The portable telephone 7 is of a type that has a function of receiving a television signal or the like so that the user can watch television. A display 8 of the portable telephone 7 is vertically long. At its lower portion, the portable telephone 7 is provided with charge terminals 15a and 15b to charge a battery (not shown) incorporated in the portable telephone 7, and fitting portions 14a and 14b to fit with protrusions 4a and 4b provided to a holder portion 2.

The desktop charger holder 1 for the portable telephone mainly comprises the holder unit 2 which accommodates the portable telephone 7 and a base 3 which supports the holder portion 2. The holder portion 2 has the right size to store the portable telephone 7. The storing space of the holder portion 2 almost forms a rectangle with two short sides that correspond to the upper portion and lower portion of the portable telephone 7. Of the two short sides, one is provided with the protrusions 4a and 4b described above and electrode terminals 6a and 6b to charge the battery incorporated in the portable telephone 7, at positions respectively corresponding to the fitting portions 14a and 14b and charge terminals 15a and 15b of the portable telephone 7. The remaining one of the two short sides is provided with a hook 5 which presses the portable telephone 7 so that the protrusions 4a and 4b fit with the fitting portions 14a and 14b of the portable telephone 7 to hold and fix the portable telephone 7, and that the electrode terminals 6a and 6b come into contact with the charge terminals 15a and 15b to start charging. The hook 5 is configured to bias the portable telephone 7 by using an elastic member 5a (see FIG. 2A), e.g., a spring. By employing this arrangement, the user can set the portable telephone 7 on the holder portion 2 reliably and charge the portable telephone 7 reliably while watching television with the display 8 of the portable telephone 7.

Figure 2A:
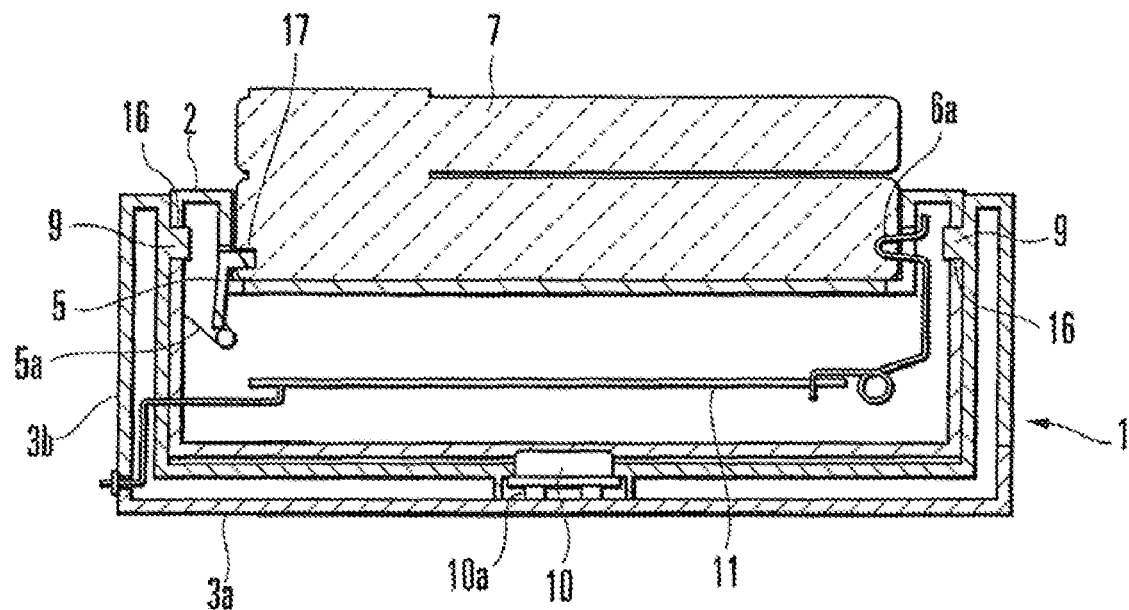
FIG. 2A is a schematic longitudinal sectional view of the desktop charger holder shown in FIG. 1 on which the portable telephone is set.
Figure 2B:
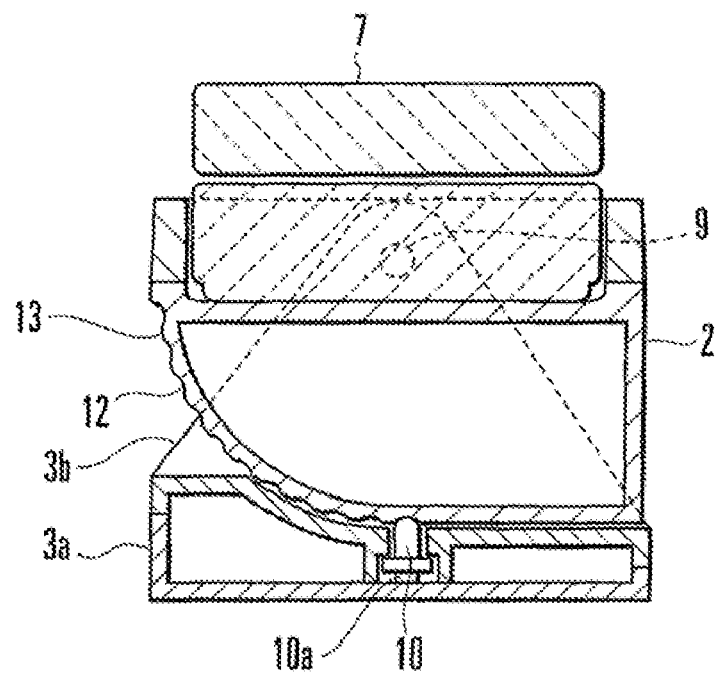
FIG. 2B is a schematic cross-sectional view of the desktop charger holder corresponding to FIG. 2A.
Figure 3A:
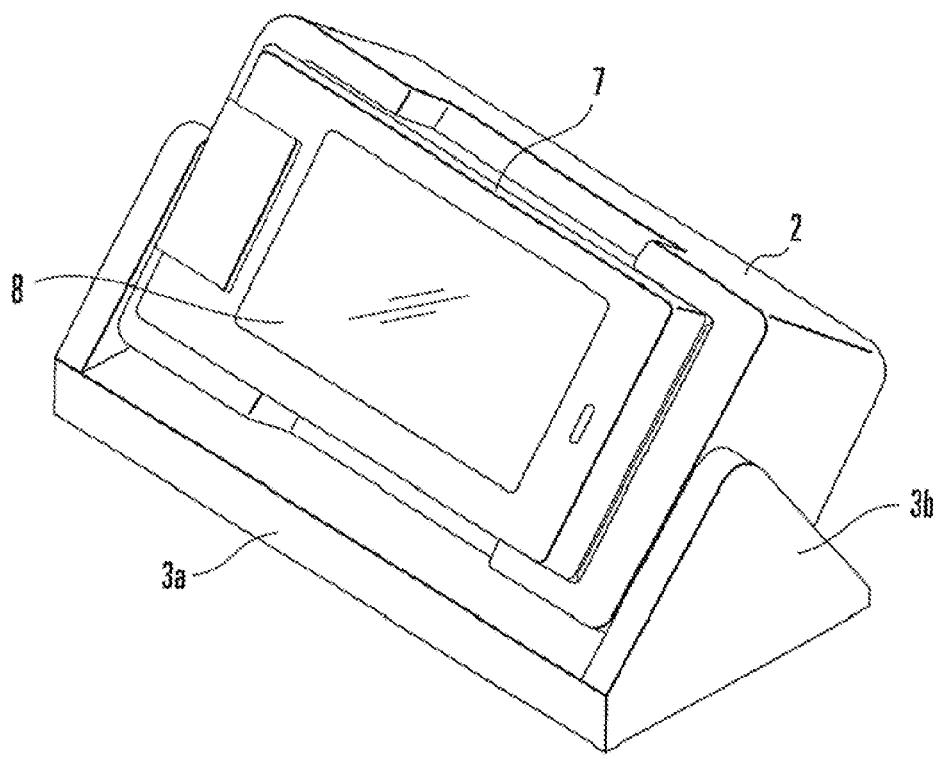
FIG. 3A is a perspective view of the desktop charger holder shown in FIG. 1A which is in a use state.
Figure 3B:
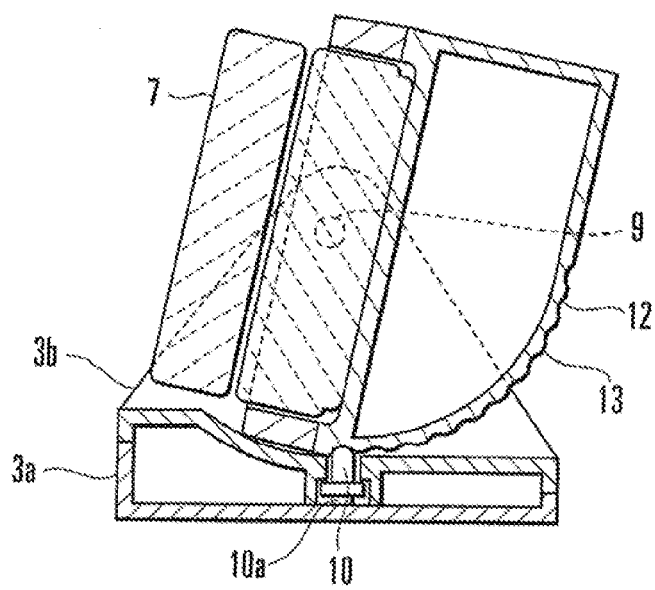
FIG. 3B is a schematic cross-sectional view corresponding to FIG. 3A.

FIGS. 2A and 2B show sections of the portable telephone 7 which is set on the desktop charger holder 1 such that the display 8 of the portable telephone 7 faces up. Note that each section assumes a case in which the holder portion 2 is cut at a position to include a projection 10 serving to hold and fix the holder portion 2. Furthermore, FIGS. 3A and 3B show a case in which the portable telephone 7 is set on the desktop charger holder 1 such that the display 8 of the portable telephone 7 comes to the front. The section of FIG. 3B also assumes a case in which the holder portion 2 is cut at the portion of the projection 10.

The base 3 has a bottom 3*a* which forms the bottom surface of the base 3, and two side walls 3*b* which form the two side surfaces of the base 3. The bottom 3*a* almost forms a rectangle. The side walls 3*b* almost form triangles and extend from the two ends of the bottom 3*a* in directions almost perpendicular to the bottom 3*a*. Cylindrical shafts 9 project on the opposing surfaces of the two side walls 3*b*. The shafts 9 fit in holes 16 formed almost at the centers of the two side surfaces of the holder portion 2. The holder portion 2 pivots through about a ¼ turn about the shafts 9 as the center. More specifically, the pivot enabling means of the holder portion 2 comprises the shafts 9 formed on the base 3 and the holes 16 formed in the holder portion 2. In FIGS. 2A and 2B, the pivot range of the pivot enabling means is a range in which the display 8 of the portable telephone 7 set on the holder portion 2 turns from the ceiling to the front. Midway along the turn, the display 8 is stopped at an arbitrary position by the projection 10 and a recess 12 (to be described later). The projection 10 and recess 12 constitute a holding/fixing means which holds and fixes the pivot angle of the holder portion 2 with respect to the base.

As shown in FIG. 2B, the shafts 9 are respectively formed near the tops of the almost triangular side walls 3*b* of the base 3. The thicknesses and materials of the shafts 9 can be appropriately determined considering the size and weight of the holder portion. The shafts 9 and holes 16 can pivot the holder portion 2 with respect to the base 3 at a low cost and with ease.

The hook 5 is configured to bias the portable telephone 7 toward the electrode terminal 6*a* with the elastic member 5*a*, e.g., a spring. A groove 17 is formed in the upper portion of the portable telephone 7. The hook 5 biases the portable telephone 7 by utilizing the groove 17. The distal end shape and size of the hook 5, the size of the groove 17, and the like are appropriately designed such that the hook 5 biases the portable telephone 7 efficiently. The material of the hook 5 is desirably rubber or a plastic resin because the hook 5 abuts against the groove 17 of the portable telephone 7.

A circuit panel 11 and electrode terminals 6*a* and 6*b* to charge the battery incorporated in the portable telephone 7 are provided in the holder portion 2. The circuit panel 11 is connected to the electrode terminals 6*a* and 6*b* by wires. The circuit panel 11 is connected to a vinyl cord. The distal end of the vinyl cord is connected to a plug to be connected to the home 100-V outlet. The wires and vinyl cord are formed not to interfere with the pivot motion of the holder portion 2.

One of the characteristic features of this exemplary embodiment resides in the holding/fixing means for holding and fixing the pivot angle of the holder portion 2. In FIGS. 2A and 2B, the holding/fixing means comprises the recess 12 formed in the holder portion 2 and the projection 10 formed on the base 3.

The projection 10 is formed at the center of the bottom 3*a* of the base 3. The distal end of the projection 10 is rounded. An elastic member 10*a* such as a spring provided under the projection 10 biases the projection 10 to abut against the recess 12 formed in a bottom surface 13 of the holder portion 2.

One corner of the bottom surface 13 of the holder portion 2 is cut off to form a cylindrical surface. In FIG. 2B, the bottom surface 13 of the holder portion 2 forms a cylindrical surface of about ¼ a circumference. The recess 12 is formed at that position of the cylindrical surface portion of the bottom surface 13 of the holder portion 2 where it opposes the projection 10. More specifically, the recess 12 comprises a plurality of recesses 12 formed at a predetermined interval on that line of the bottom surface 13 which opposes the projection 10 when the holder portion 2 is pivoted. Although a total of 11 recesses 12 are formed in FIG. 2B, the number of recesses 12 is not limited to 11. The recess 12 has a dish-like shape. With the projection 10 being biased by the elastic member 10*a* to abut against a given recess 12, when a pivoting force is applied to the holder 2, the projection 10 smoothly moves from the given recess 12 to the adjacent recess 12. The recess 12 need not have a dish-like shape, but its shape can be appropriately determined considering the distal end shape of the projection 10, the force of the spring, and the like.

In this manner, the projection 10 abuts against the recess 12 to fix the pivot angle of the holder portion 2. When pivoting the holder portion 2 from the position where it is currently held and fixed, if a pivoting force larger than the force of the elastic member 10*a* causes the projection 10 to abut against the recess 12 is applied to the holder portion 2, the holder portion 2 can be pivoted (moved) easily. In FIG. 2B, the holder portion 2 pivots from this state counterclockwise almost through 90°.

As shown in FIG. 2B, the left half of the section of the base 3 conforms to the cylindrical surface of almost ¼ the circumference of the holder portion 2, so that the projection 10 can abut against the recess 12 in a good manner. When pivoting the holder portion 2 clockwise as well through 90°, the cylindrical surface of almost ¼ the circumference of the holder portion 2 may be changed to a cylindrical surface of almost ½ a circumference, and the right half of the base 3 which is on the right side of the projection 10 may have a shape confirming to the cylindrical surface of almost ½ the circumference.

As described above, the shafts 9 which form the pivot enabling means for the holder portion 2 are respectively formed near the tops of the side walls 3*b* of the triangular base 3, and the holes 16 which fit with the shafts 9 are respectively formed almost at the centers of the side surfaces of the holder portion 2. Thus, when the portable telephone 7 is stored in the holder portion 2, the barycentric position is present on the surface of the bottom 3*a* of the base 3 or almost on the pivot axis of the holder 2, providing very good operation stability. The positions of the shafts 9 and holes 16, however, are not limited to those described above. For example, when the side walls 3*b* of the base 3 are rectangular, the shafts 9 can be set at any positions on the upper portions of the respective side walls 3*b* as far as the barycentric position falls within the surface of the bottom 3*a* of the base 3. The material, weight, and the like of the holder portion 2 can be appropriately selected such that the barycentric position is present on the surface of the bottom 3*a* of the base 3 or almost on the pivot axis of the holder 2.

The desktop charger holder 1 according to this exemplary embodiment can be used very easily. The user sets the portable telephone 7 on the holder portion 2 and pivots the holder portion 2 about the shafts 9 as the center until the display 8 is at an angle providing a good readability. FIG. 3B shows a state in which the holder portion 2 is set at such a position that the display 8 almost comes to the front. In this state, when the holder portion 2 is pivoted counterclockwise through almost 90°, it reaches to the state in FIG. 2B. As described above, when the portable telephone 7 is stored in the holder portion 2, the barycentric position is present on the surface of the bottom 3*a* of the base 3 or almost on the pivot axis of the holder portion 2, that is, on a line connecting the shafts 9. This provides high stability, resulting in a convenient holder. Furthermore, the central position of the display 8 hardly changes even when the holder portion 2 is pivoted. This also provides a convenient holder.

Second Exemplary Embodiment

Figure 4:
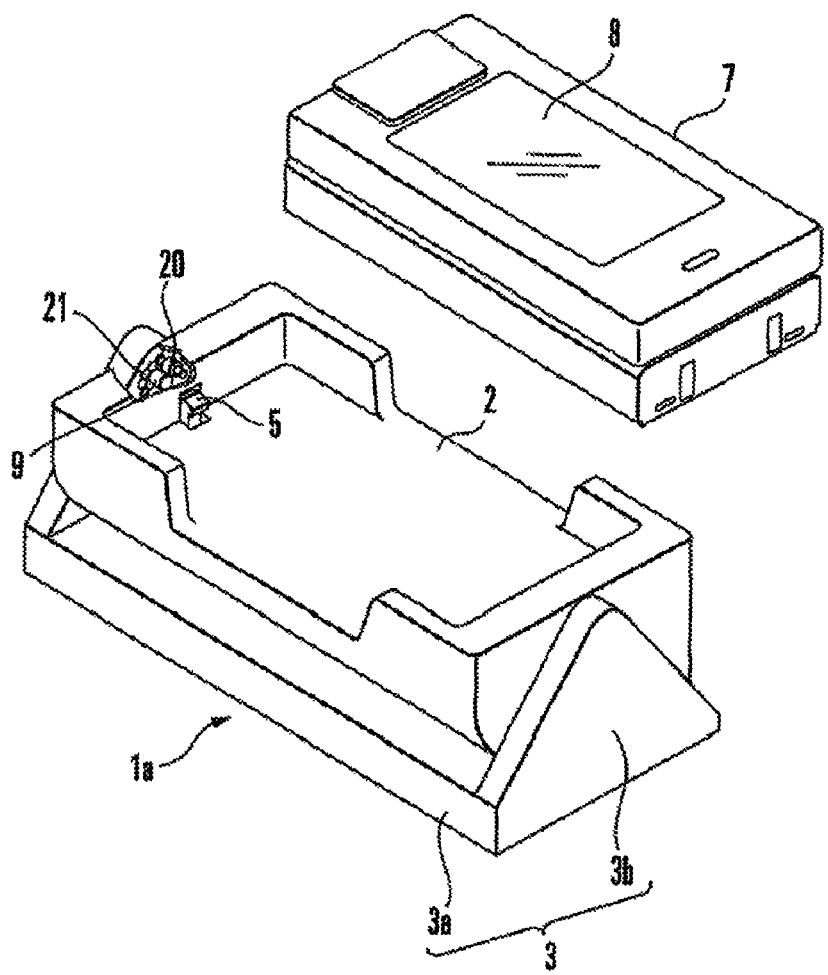
FIG. 4 is a perspective view showing a state immediately before a portable telephone is set on a desktop charger holder according to the second exemplary embodiment of the present invention.
Figure 5:
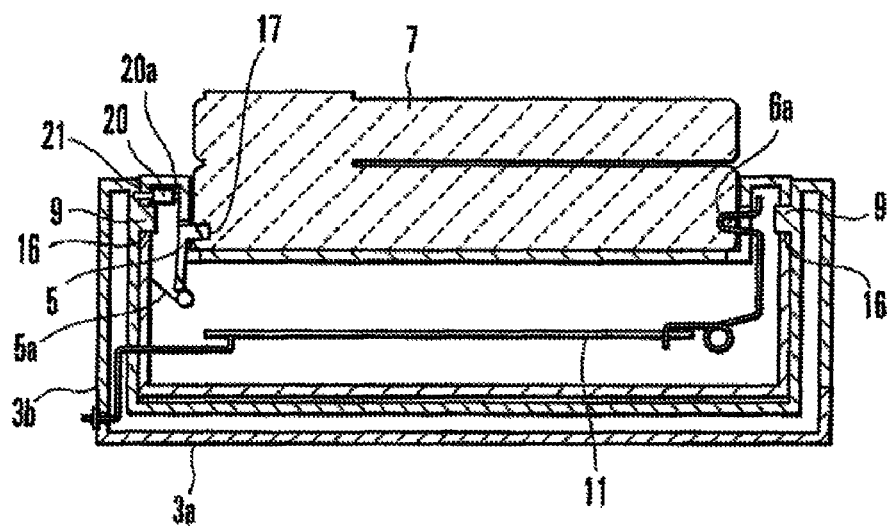
FIG. 5 is a schematic longitudinal sectional view of the desktop charger holder shown in FIG. 4 on which the portable telephone is set.
Figure 6A:
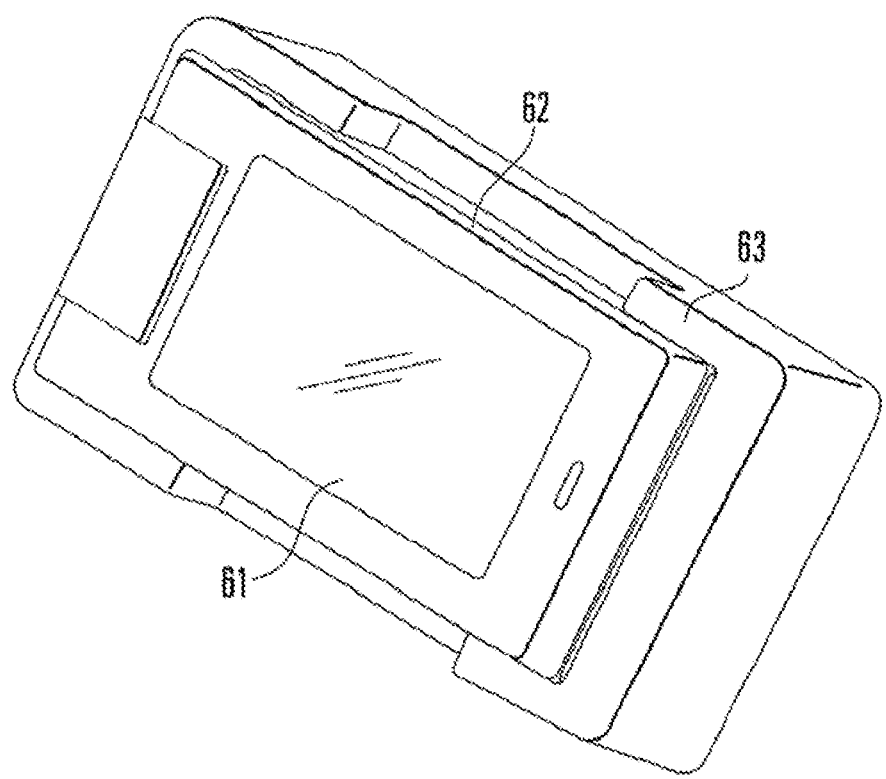
FIG. 6A is a perspective view of a conventional desktop charger holder.
Figure 6B:
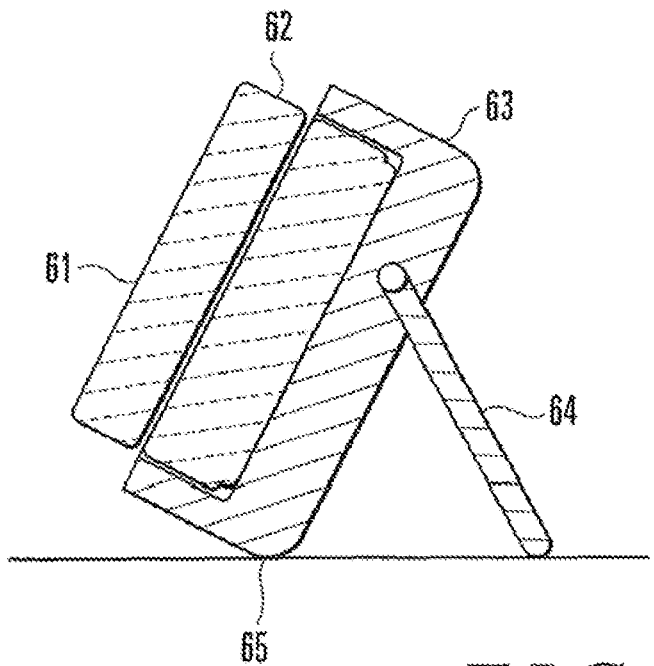
FIG. 6B is a schematic cross-sectional view of the desktop charger holder shown in FIG. 6A.
Figure 7:
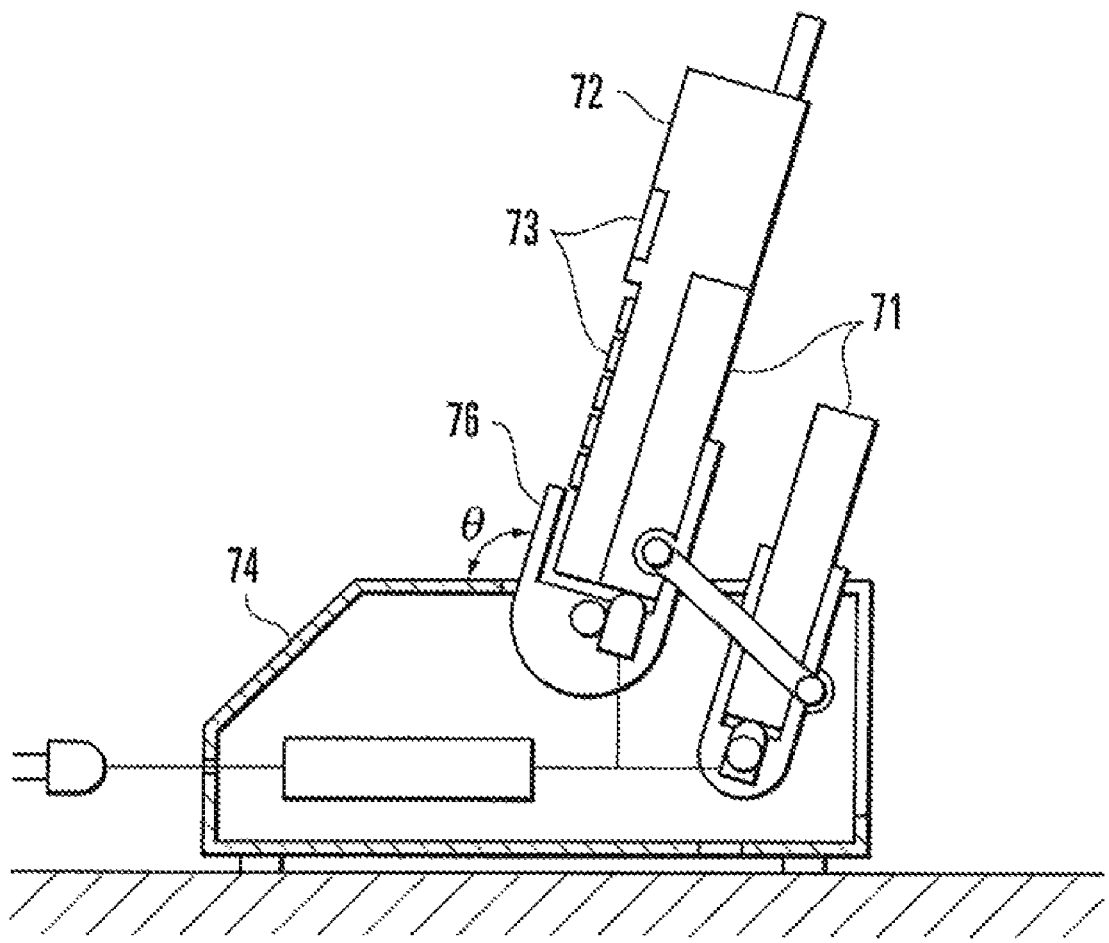
FIG. 7 is a schematic sectional view of a conventional charging device in which the set angle of the portable telephone can be changed.
Figure 8A:
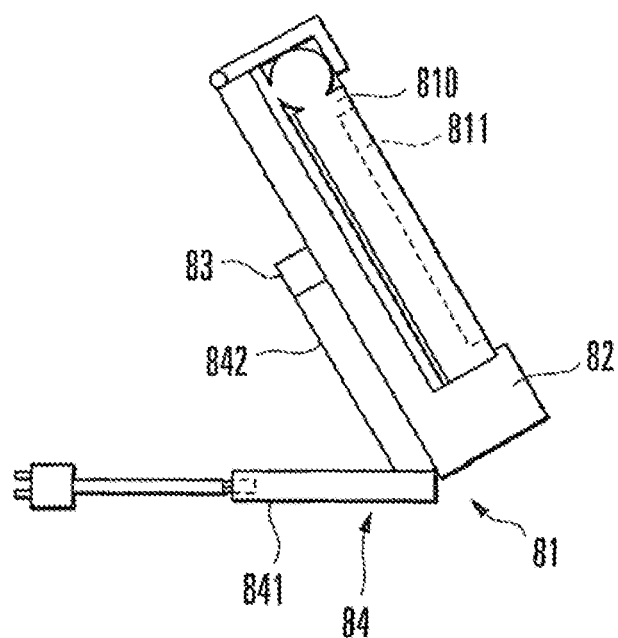
FIG. 8A is a side view of a conventional charger in which the set angle of the display screen of a portable telephone can be changed.
Figure 8B:
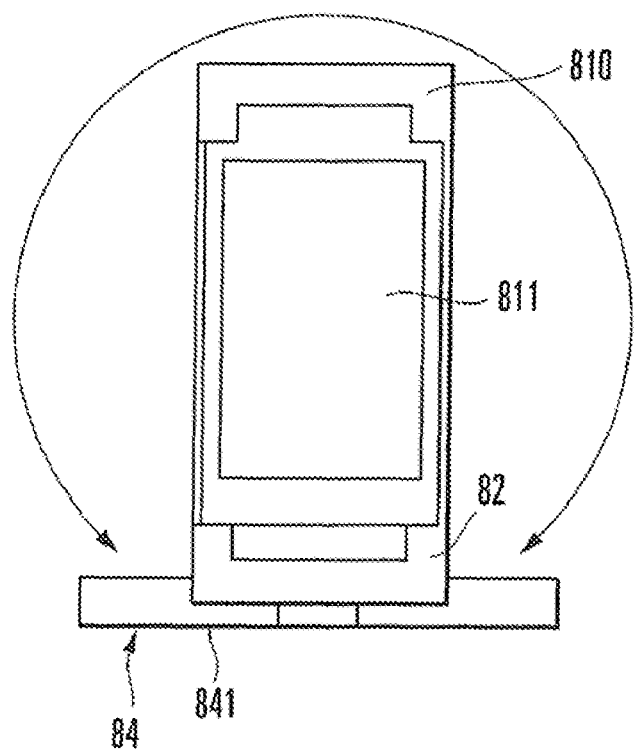
FIG. 8B is a front view of the charger shown in FIG. 8A.

FIG. 4 shows a desktop charger holder for a portable telephone according to the second exemplary embodiment of the present invention. FIG. 4 shows a state immediately before a portable telephone 7 is set on a desktop charger holder 1a. FIG. 5 shows a state in which the portable telephone 7 is set on the desktop charger holder 1a.

The second exemplary embodiment is different from the first exemplary embodiment in a holding/fixing means for holding and fixing the pivot angle of a holder portion 2. Except for this, the arrangement of the second exemplary embodiment is the same as that of the first exemplary embodiment, and a repetitive description will be omitted. The holding/fixing means comprises a recess 21 and projection 20. The recess 21 and projection 20 are different from their equivalents in the first exemplary embodiment in their positions and sizes.

The projection 20 is formed near a hole 16 in one side surface of the holder portion 2. In the same manner as in the first exemplary embodiment, an elastic member 20a such as a spring causes the projection 20 to project. The recess 21 is formed at that position of a side wall 3b of the base 3 where it opposes the projection 20. More specifically, assuming that the distance between the hole 16 and projection 20 is determined as r, the recess 21 comprises a plurality of recesses 21 formed at a predetermined interval on a circumference that has a radius r and shafts 9 on side walls 3b as the center. The elastic member 20a biases the projection 20 to abut against one of the recesses 21, thus holding and fixing the pivot angle of the holder portion 2. Although the holding/fixing means comprising the recesses 21 and projection 20 is formed on only one side of a desktop charger holder 1a in FIG. 4, it may be formed on each side of the desktop charger holder 1a.

In the desktop charger holder 1a of this exemplary embodiment as well, when the portable telephone 7 is stored in the holder portion 2, the barycentric position is present on the surface of a bottom 3a of the base 3 or almost on the pivot axis of the holder portion 2, that is, on a line connecting the shafts 9. This provides high stability, resulting in a convenient holder. Furthermore, the central position of a display 8 hardly changes even when the holder portion 2 is pivoted. This also provides a convenient holder.

INDUSTRIAL APPLICABILITY

The desktop charger holder for the portable telephone of the present invention is directed to a desktop charger holder for a portable telephone which has a function of receiving a television signal or the like so that the user can watch television, and can be applied to any portable telephone having such a function.

The invention claimed is:

1. A desktop charger holder comprising:
a holder portion which stores a portable telephone;
a base which supports said holder portion;
a pivot enabling unit which enables said holder portion to be pivotal with respect to said base; and
a holding/fixing unit which holds and fixes a pivot angle of said holder portion with respect to said base,
wherein a barycenter of the portable telephone and said holder portion, when the portable telephone is stored in said holder portion, is present on a surface of said base,
wherein said base comprises:
a bottom which forms a bottom surface of said base, and two side walls which form two side surfaces of said base, and
said pivot enabling unit comprises
a shaft formed on each of opposing surfaces of said two side walls of said base, and
a hole which is formed in each of two side surfaces of said holder portion and fits on said shaft to enable said holder portion to be pivotal with respect to said base,
and wherein said holding/fixing unit comprises:
a projection formed near said hole in each of said side surfaces of said holder portion,
a recess formed at a position of each of said side walls of said base where said recess opposes said projection, and
an elastic member which biases said projection to abut against said recess.

2. A desktop charger holder according to claim 1, wherein said holding/fixing unit is arranged between said holder portion and said base.

3. A desktop charger holder according to claim 1, wherein a barycenter of the portable telephone and said holder portion, when the portable telephone is stored in said holder portion, is present on a substantially pivot axis of said holder.

4. A desktop charger holder according to claim 1, wherein said holder portion comprises
a protrusion formed at a position to oppose a fitting portion of the portable telephone stored in said holder portion,
a hook which fixes the portable telephone to said holder portion with said protrusion being fitted in the fitting portion, and
an elastic member which biases said hook.

5. A desktop charger holder according to claim 4, wherein said holder portion further comprises an electrode terminal which comes into contact with a charge terminal of the portable telephone fixed to said holder portion to charge the portable telephone.

6. A desktop charger holder according to claim 1, wherein said two side walls of said base extend from two ends of said bottom of said base in a direction substantially perpendicular to said bottom, and
said hole of said pivot enabling unit is formed at a substantially center of each of said two side surfaces of said holder portion.

7. A desktop charger holder according to claim 1, wherein said recess comprises a plurality of recess formed at a predetermined interval on a circumference that has said shaft on each of said side walls of said base as a center.

8. A desktop charger holder comprising:
a holder portion which stores a portable telephone;
a base which supports said holder portion;
pivot enabling means for enabling said holder portion to be pivotal with respect to said base; and
holding/fixing means for holding and fixing a pivot angle of said holder portion with respect to said base,
wherein a barycenter of the portable telephone and said holder portion, when the portable telephone is stored in said holder portion, is present on a surface of said base,
wherein said base comprises:
a bottom which forms a bottom surface of said base, and two side walls which form two side surfaces of said base, and
said pivot enabling means comprises
a shaft formed on each of opposing surfaces of said two side walls of said base, and
a hole which is formed in each of two side surfaces of said holder portion and fits on said shaft to enable said holder portion to be pivotal with respect to said base,
and wherein said holding/fixing means comprises:

a projection formed near said hole in each of said side surfaces of said holder portion, a recess formed at a position of each of said side walls of said base where said recess opposes said projection, and an elastic member which biases said projection to abut against said recess.

* * * * *